US008245922B2

(12) United States Patent
Gerigk et al.

(10) Patent No.: US 8,245,922 B2
(45) Date of Patent: Aug. 21, 2012

(54) METHOD AND DEVICE FOR IDENTIFYING AND AUTHENTICATING OBJECTS

(75) Inventors: Markus Gerigk, Köln (DE); Ludger Brüll, Leverkusen (DE); Martin Friedrich, Köln (DE); Jürgen Focke, Düsseldorf (DE); Simon Vougioukas, Köln (DE); Josef Kenfenheuer, Bergisch Gladbach (DE); Klaus Würschinger, Odenthal (DE); Wolfgang Joa, Köln (DE)

(73) Assignee: Bayer Technology Services GmbH, Leverkusen (DE)

( * ) Notice: Subject to any disclaimer, the term of this patent is extended or adjusted under 35 U.S.C. 154(b) by 0 days.

(21) Appl. No.: 12/864,822

(22) PCT Filed: Jan. 23, 2009

(86) PCT No.: PCT/EP2009/000411
§ 371 (c)(1),
(2), (4) Date: Nov. 19, 2010

(87) PCT Pub. No.: WO2009/097975
PCT Pub. Date: Aug. 13, 2009

(65) Prior Publication Data
US 2011/0049235 A1 Mar. 3, 2011

(30) Foreign Application Priority Data
Feb. 5, 2008 (DE) ......................... 10 2008 007 731
Oct. 29, 2008 (DE) ......................... 10 2008 053 798

(51) Int. Cl.
*G06K 5/00* (2006.01)

(52) U.S. Cl. ........................................ 235/380; 235/454

(58) Field of Classification Search .................. 235/380, 235/462.01, 454, 382
See application file for complete search history.

(56) References Cited

U.S. PATENT DOCUMENTS 6,923,374 B2 * 8/2005 Knowles et al. .............. 235/454
7,419,098 B2 * 9/2008 Hyde et al. ............... 235/462.43
7,484,665 B2 * 2/2009 Koch et al. ............... 235/462.01
7,527,200 B2 * 5/2009 Tsikos et al. .................. 235/454

FOREIGN PATENT DOCUMENTS

DE 199 09 135 A 9/2000
EP 1 802 093 A 6/2007
WO 2005 088533 A 9/2005
WO 2006 016114 A 2/2006

OTHER PUBLICATIONS

ISO/IEC 15420; International Standard; Information Technology—Automatic identification and data capture techniques—EAN/UPC bar code symbology specification Second edition; Dec. 15, 2009.
ISO/IEC 16022; International Standard; Information Technology—Automatic identification and data capture technuqies—Data Matrix bar code symbology specification Second edition; Sep. 15, 2006.
International Search Report dated Jun. 5, 2009.

* cited by examiner

*Primary Examiner* — Daniel St. Cyr
(74) *Attorney, Agent, or Firm* — Norris McLaughlin & Marcus, P.A.

(57) ABSTRACT

The invention relates to a process for identifying and authenticating an object. The object includes an identifier which has a code region and a scattering region and is irradiated with electromagnetic radiation for identifying and/or authenticating the object, in such a manner that the electromagnetic radiation reflected by the code region is used for identifying the object and the electromagnetic radiation reflected by the scattering region is used for authenticating the object. In addition, the invention relates to a device for the parallel identification and authentication of an object.

11 Claims, 6 Drawing Sheets

METHOD AND DEVICE FOR IDENTIFYING AND AUTHENTICATING OBJECTS

This is an application filed under 35 USC §371 of PCT/EP2009/000411, claiming priority to DE 10 2008 007 731.3 filed on Feb. 5, 2008 and DE 10 2008 053 798.5 filed on Oct. 29, 2008.

BACKGROUND OF THE INVENTION (1) Field of the Invention

The present invention relates to a process for the parallel identification and authentication of objects and to a device for identifying and/or authenticating objects.

The automatic identification of objects by optical methods is known in the prior art. Everyone is familiar, for example, with bar codes which are applied to products and/or packaging and which allow the automatic identification of products for determining, for example, their price.

(2) Description of Related Art

One known example of a bar code is the EAN 8 code which is defined in International Standard ISO/IEC 15420. This is a code with a string of 8 digits in the form of bars and gaps of varying widths. Usually the bars are printed in black printing ink on a white substrate, such as for example the packaging of the object to be marked, or on the object itself. The code is machine-read by scanning it with a suitable light source and capturing the reflected light with a detector. Since the dark bars reflect less light than the bright gaps, the reflected light beam displays corresponding differences in brightness which are identified by the detector and converted into electronic signals. The electronic signals are analyzed by microprocessors. Usually the decoded string of digits is emitted via an output channel.

In addition to the abovementioned EAN 8 code, numerous other bar codes exist which encode not only digits but also letters, special characters and control characters. In addition, some codes contain error-detecting and error-correcting characters which allow errors in signal transmission to be detected and even in some cases to be corrected.

One further development of bar codes consists of 2D codes, in which the information is optically encoded not only one-dimensionally but also in two dimensions. One subgroup of 2D codes consists of so-called matrix codes, one known example of which is the data matrix code defined in International Standard ISO/IEC 16022. The advantage of matrix codes is their higher information density. Depending on the size of the data matrix code, up to 2334 ASCII characters (seven bits), 1558 extended ASCII characters (eight bits) or 3116 digits can be encoded. Whereas one-dimensional bar codes are usually read by scanning them with a focussed beam of light, two-dimensional matrix codes are read using camera systems, which is why matrix codes have so-called “finder patterns” for guiding the reading device.

In the following, bar codes, 2D codes and matrix codes will be jointly referred to as optical codes. Optical codes can be produced simply and in an extremely inexpensive manner (by printing) and can be scanned quickly and robustly. They are ideally suitable for the identification of objects. In particular, optical codes are suitable for tracking and tracing objects. For this purpose the object is given a number to allow it to be identified at each stage of the logistic chain and its movement to be traced from one stage of the logistic chain to another.

Optical codes are, however, simple to copy, reproduce and fake and cannot therefore be used for the authentication of objects.

Objects do, however, exist which are required to be individually re-identified and authenticated at a later date. One simple example of such objects consists of ID cards. ID cards must be individually unique. With the increase in automation the uniqueness of each ID card must be machine-readable.

RFID chips can be used for this purpose. They contain a secret key which cannot be read from the outside. When communicating with an RFID chip, messages from the chip are encrypted by this secret key. These messages can be decrypted by a corresponding public key. Since the secret key is not, however, accessible it is very difficult to create a duplicate or dummy (a fake). By attaching RFID chips to objects it is therefore fundamentally possible to identify and authenticate such objects. Many objects do however exist which, for technical and/or economic reasons, cannot be fitted with an RFID chip. RFID chips are, for example, liable to crack and susceptible to damage from electromagnetic interference fields. RFID chips are far more expensive than printed optical codes. In addition, there have recently been increasing reports of faked or counterfeited RFID chips.

WO 2005088533(A1) describes a process which does not require any additional data carrier (optical code, RIFD chip) for identifying and authenticating an object and which enables objects to be clearly allocated by means of their surface structure. For this purpose, a laser beam is focussed on the surface of the object, moved over its surface (scanning) and the beams scattered to differing degrees and at various angles at different points on the surface of the object are detected by photodetectors. The scattered radiation detected by this process is typical of many different materials and is very difficult to fake since it is caused by incidental phenomena during the manufacturing process of the materials. Paper-like objects, for example, have a fibrous structure due to their manufacturing process which is unique for each object produced. The scattering data of the individual objects is stored in a database in order to be able to authenticate the object at a later date. To this end the object is scanned once again and the scattering data compared with the stored reference data.

The disadvantage of the above process is that a comprehensive database has to be created for the scattering data of all the scanned objects. Not only does this database have to have a high storage capacity for storing the high quantities of scattering data of a large number of objects but quick access to the data in the database must be possible since authentication requires comparing the scanned scattering data with all of the reference data in the database, in order to find the correct data set. Due to positioning inaccuracies during scanning, slight changes in the scattering pattern of the object over time (due to soiling, wear, etc.) and technical differences between the various scanning devices, the scanned scattering data of an object are never absolutely identical but display variations. It is therefore necessary to make a comparison with all of the reference data in order to find the most identical data set. In addition, the positioning of the object beneath the scanning device must be sufficiently accurate to provide sufficiently precise identity during the matching process. In simple terms this means ensuring that the region used for authentication is always the same. This means that the object must be positioned in relation to the scanning device. The positioning accuracy must be considerably higher than in the case of optical codes, as quickly becomes clear on comparing the dimensions of the bars and gaps of a bar code with the dimensions of the scattering centres of a paper-like object. Higher positioning accuracy does however actually mean a longer time for scanning an object (the time for preparing for the measurement+the measuring time). Whereas optical codes only have to be placed in the optical field of view of a scanner, in the case of WO 2005088533(A1), the scattering pattern of an object can only be determined if it is precisely aligned and fixed in relation to the scanning unit.

Due to the above disadvantages, the process of WO 2005088533(A1) is only suitable to a very limited extent for identifying and tracing objects. Also, identification solutions based on the scanning of optical codes are well-established. An IT infrastructure does therefore already exist for optical codes which, for the abovementioned reasons, cannot be used for the process of WO 2005088533(A1). Before the process of WO 2005088533(A1) could be used, a new IT infrastructure would be required or at least the expansion of the existing IT infrastructure, which would make it difficult to introduce the process of WO 2005088533(A1) onto the market (a high market entry barrier). The straight migration from established technology (identification based on the scanning of optical codes) to a new technology (identification and authentication by recording the scattering pattern) is not possible.

It can therefore be affirmed that processes and devices for identifying and authenticating objects are known from the prior art. Processes and devices for identifying objects by means of optical codes are, however, due to the ease with which the features used for identification can be faked, not suitable for the authentication of objects. Conversely, although the authentication process of WO 2005088533(A1) is ideal for authentication, it is not suitable for tracking and tracing objects due to the high quantities of data involved and the correspondingly high demands on the IT backend system (the database/network), the high demands on positioning accuracy and the corresponding long duration of the scanning process.

Thus, given the known prior art, the problem arose of providing a process which allows objects to be identified and authenticated while as far as possible being able to use the existing IT infrastructure for existing identification solutions. The process should be inexpensive and have a low market entry barrier. It should be robust and simple to handle by users. If possible, the process should not require any reaccustomation on the part of users but its use should be similar to that of existing processes.

BRIEF SUMMARY OF THE INVENTION

The present invention therefore relates to a process for the parallel identification and authentication of an object which is characterized in that the object comprises an identifier which has a code region and a scattering region and is irradiated with electromagnetic radiation for identifying and/or authenticating the object, in such a manner that the electromagnetic radiation reflected by the code region is used for identifying the object and the electromagnetic radiation reflected by the scattering region is used for authenticating the object.

Identification is understood to be the process which is used for recognizing a person or object. If an object or person has been recognized it/he/she can be allocated or allocation to the recognized object or person can take place. If, for example, a product (object) has been identified, a price or its place of destination can be allocated thereto. The person or object is identified by means of characteristic features which distinguish him/her/it from other persons or objects.

Authentication is understood to be the process of checking (verifying) a claimed identity. The authentication of objects, documents or data is the process of confirming their authenticity and the fact that they are non-falsified, non-faked originals.

As with identification, authentication is also carried out by means of features which are characteristic of the person or object concerned and which distinguish them from other persons or objects. In contrast to identification, those features used for authentication are preferably not transferable and not capable of being copied or faked. Using physical methods, unmistakable electronically processible data are determined from physical features in order to allow objects to be automatically scanned and allocated. In the following, those characteristic data which are used for the identification of objects are referred to as the identification code and those characteristic data which are used for the authentication of objects are referred as the signature.

Parallel identification and authentication is understood to mean that the process according to the invention can be used both for individual identification or authentication and/or for combined, i.e. successively conducted, identification and authentication, and/or for simultaneous, i.e. synchronously conducted, identification and authentication.

The process according to the invention is characterized in that electromagnetic radiation is guided onto the object to be identified and/or authenticated and the signal reflected by the object is analyzed and interpreted. The irradiation of the object and the interpretation of the radiation reflected by the object are carried out by a scanning unit, which also forms part of the present invention.

The authentication of objects is preferably carried out using coherent electromagnetic radiation.

The object comprises an identifier. This identifier is used for identifying and/or authenticating the object. It is inseparably connected to the object. If any attempt is made to separate the identifier from the object, the identifier becomes useless, i.e. it can no longer be used for identifying and/or authenticating the object. The identifier comprises a region which is provided with an optical code—hereinafter referred to as the code region—and a region for the detection of the scattering pattern—hereinafter referred to as the scattering region. The scattering region and the code region can be spatially separate from each other, i.e. they can be adjacent to each other, or they can partially overlap each other or either region can completely overlap the other (see FIG. 1). The identifier is preferably flat.

According to the invention, the code region is used for the identification of objects, whereas the scattering region is used for the authentication of objects. The identifier can be an element which is connected to the object, but it can also be part of the object itself. If, for example, a medicament is to be identified and/or authenticated, it is usually inserted into a pack. In this case part of the pack can be used as the identifier. To this end an optical code is attached to one region of the pack and one region is defined from which the scattering pattern and thus the signature can be determined. The scattering region does not have to be marked as such, i.e. it does not, for example, have to be marked by an optical label, since the position of the scattering region can be clearly predetermined and recovered in relation to the position of the optical code. It is, for example, also conceivable for the identifier to be part of an electronic plate onto which an optical code is printed or into which an optical code is punched. It is, for example, also conceivable for the identifier to be a label onto which an optical code is printed and which has already been scanned once to determine the scattering pattern. In this case the label is authentic and is preferably inseparably connected to the object, thus making the object itself capable of being authenticated. The scattering region of the identifier preferably has a surface structure which is produced by the method of its production and/or treatment and which is characteristic and difficult to fake or reproduce. Preferably, the material used for the scattering region is a fibrous material such as paper, cardboard or a textile material. The scattering region and the code region can consist of different materials. They can be in one or more than one piece. Preferably the code and the scattering region consist of the same material. The identifier is preferably in one piece.

The identifier preferably has a size of 0.1 $cm^2$ to 100 $cm^2$, and particularly preferably a size of 0.5 $cm^2$ to 30 $cm^2$.

Any optical, machine-readable code, such as for example a bar code, a stacked code, a matrix code or an OCR text (OCR=Optical Character Recognition) can be used as the optical code. The size of the optical code depends on the individual code specification.

The electromagnetic beam projected onto the identifier is partially reflected by the identifier. The reflected radiation is captured by at least one detector and analyzed. Depending on whether the electromagnetic radiation impinges on the code region or the scattering region or both, the reflected radiation contains information for identifying or for authenticating the object or for both identifying and authenticating the object. This is illustrated by the example depicted in FIG. 2. FIG. 2(*a*) shows the signal (2-3) measured by a detector in the form of a brightness curve produced by electromagnetic radiation reflected by the code region (2-1). The dark bars of the optical code in FIG. 2(*a*) absorb most of the incident electromagnetic radiation; only a small portion is reflected, which is why the signal (2-3) measured by the detector is low in these areas. The bright gaps of the optical code in FIG. 2(*a*) reflect most of the incident electromagnetic radiation, which is why the signal (2-3) measured by the detector is high in these areas.

BRIEF DESCRIPTION OF THE DRAWINGS

FIG. 2(*b*) depicts signal measured by a detector in the form of a brightness curve produced by coherent electromagnetic radiation reflected by scattering region;

FIG. 2(*c*) depicts signal measured by a detector in the form of a brightness curve produced by coherent electromagnetic radiation reflected by a region of the identifier in which the code region and the scattering region overlap each other;

DETAILED DESCRIPTION OF THE INVENTION

Figure 1:
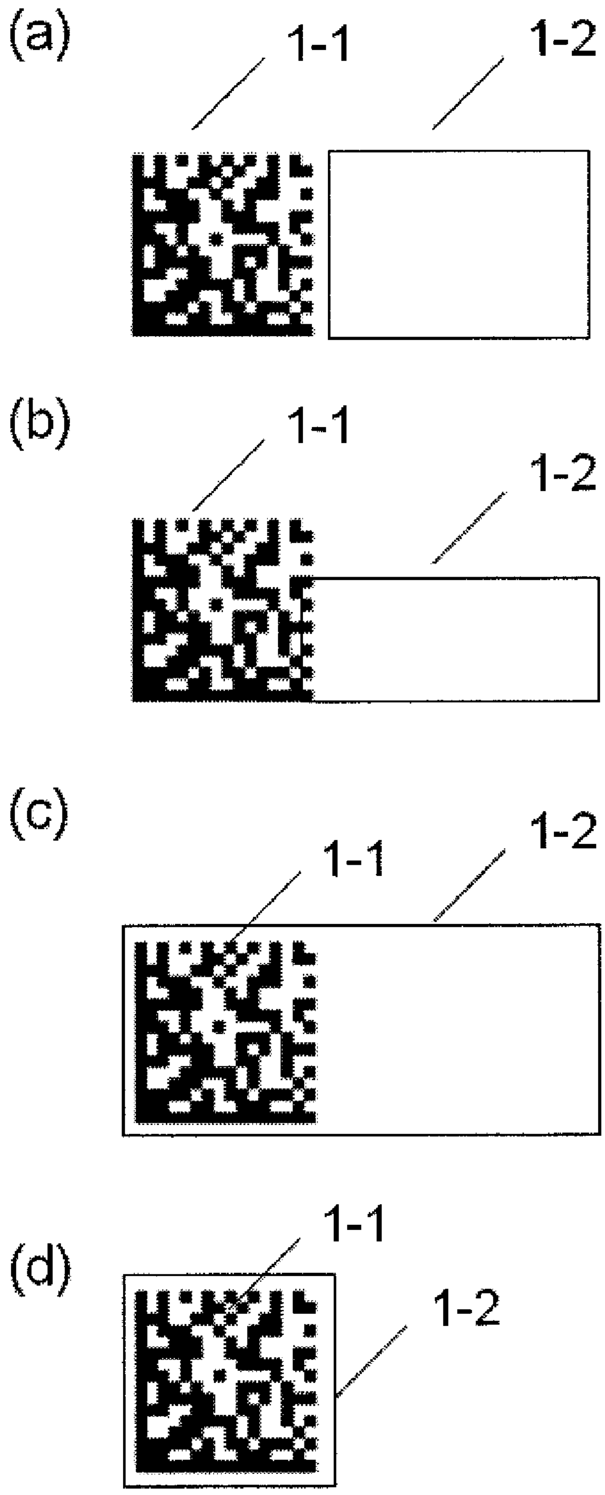
FIG. 1 depicts an identifier with a code region and a scattering region.

FIG. 1 depicts an identifier with a code region (1-1) and a scattering region (1-2). The code region (1-1) and the scattering region (1-2) can be separate from each other (FIG. 1(*a*)), they can partially overlap each other (FIG. 1(*b*)) and one region can completely enclose the other region (FIG. 1(*c*) and FIG. 1(*d*)).

Figure 2:
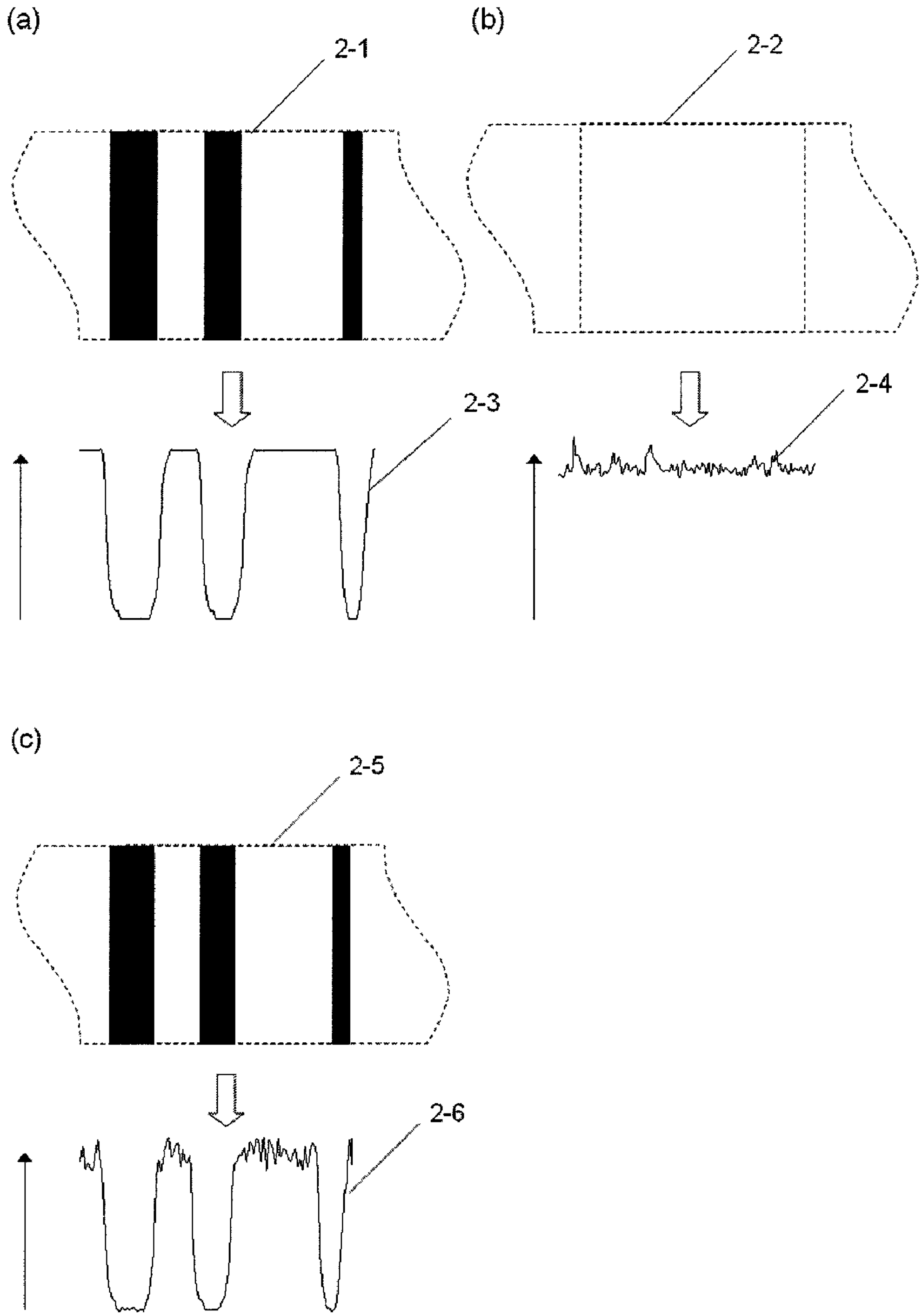
FIG. 2(*a*) depicts signal measured by a detector in the form of a brightness curve produced by electromagnetic radiation reflected by code region.

FIG. 2(*a*) depicts signal (2-3) measured by a detector in the form of a brightness curve produced by electromagnetic radiation reflected by code region (2-1). FIG. 2(*b*) depicts signal (2-4) measured by a detector in the form of a brightness curve produced by coherent electromagnetic radiation reflected by scattering region (2-2). FIG. 2(*c*) depicts signal (2-6) measured by a detector in the form of a brightness curve produced by coherent electromagnetic radiation reflected by a region (2-5) of the identifier in which the code region and the scattering region overlap each other.

FIG. 2(*b*) shows the signal (2-4) measured by a detector in the form of a brightness curve produced by coherent electromagnetic radiation reflected by the scattering region (2-2). The scattering region (2-2) has a high density of scattering centres which, on irradiation with coherent radiation, produce a combination of speckles and diffuse scattering. The signal (2-4) produced by the irradiation of the scattering region (2-2) displays lower variance than the signal (2-3) produced by the irradiation of code region (2-1).

Both signals contain information. If the signals are subjected to Fourier transform it emerges that the signal (2-3) from the code region is characterized by lower frequencies whereas the signal (2-4) from the scattering region is characterized by higher frequencies.

The signal (2-3) from the code region is preferably used for identifying the object whereas the signal (2-4) from the scattering region is preferably used for authenticating the object. The signal reflected by the code region and/or scattering region is transmitted to at least one detector, in which the electromagnetic signal is converted into an electronic signal. The signal is then optionally filtered and decoded. The decoding of the scattering signal and the determination of a signature from the scattering signal might be carried out in the manner described in WO 2005088533(A1) and/or WO 2006016114(A1). Preferably a Fourier transform signal might be used to determine the signature, since Fourier transform is invariant to translation and higher positioning tolerance therefore exists. The signal from the optical code is decoded in the manner known for the optical code concerned. In this regard, reference should be made to the extensive literature on the decoding of optical codes [e.g. C. Demant, B. Streicher-Abel, P. Waszkewitz, "Industrielle Bildverarbeitung" (Industrial image processing), Publ: Springer-Verlag, 1998, pp. 133 et seq. and J. Rosenbaum, "Barcode" (Bar codes), Publ: Verlag Technik Berlin, 2000, pp. 84 et seq.].

The object can be identified and/or authenticated by scanning the identifier dot- or linewise with an electromagnetic beam or irradiating the identifier over its entire area.

In one variant of the process according to the invention, the signals from the code region and the scattering region are scanned simultaneously, i.e. at the same time. Preferably an identifier is used for this purpose, in which the code region and the scattering region overlap (see, for example, FIGS. 1(*c*) and 1(*d*)). In this case the signals also overlap, as illustrated by the example in FIG. 2(*c*). FIG. 2(*c*) shows the signal (2-6) measured by a detector in the form of a brightness curve which is produced by coherent electromagnetic radiation reflected by a region (2-5) of the identifier in which the code region and the scattering region overlap. This signal is a combination of the signals from FIGS. 2(*a*) and 2(*b*) and therefore contains information for both identifying and authenticating the object. Signal (2-6) is dominated by the signal components of the code region and can therefore be used as it is for obtaining information for identifying the object. It can in this case be treated as if it were just a signal obtained by the mere irradiation of a code region. For the interpretation of the signal components of the scattering region, which contain information for authenticating the object, it is however useful to filter the signal (2-6) for extracting the signal components of the scattering region. For this purpose, a signal filter can be used to filter out the lower frequency components of the signal from the code region (FIG. 3).

Figure 3:
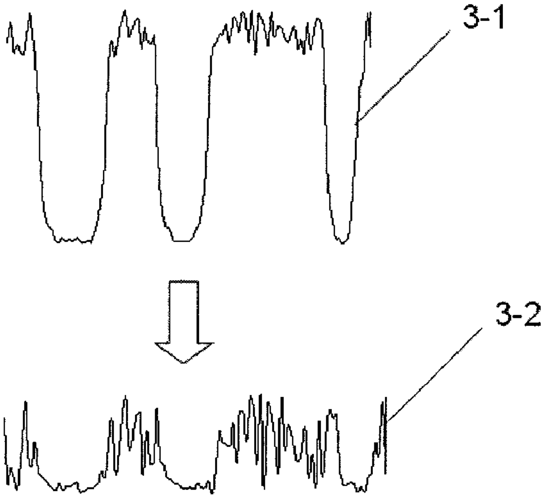
FIG. 3 depicts the effect of signal filtering.

FIG. 3 depicts the effect of signal filtering. The signal (3-1) measured by a detector and produced by coherent electromagnetic radiation reflected by one region of the identifier in which the code region and the scattering region overlap each other is freed (3-2) by signal filtering as completely as possible from the low-frequency components emanating from the optical code.

The result is a signal (3-2) which, while still being characterized by the signal from the code region, can nevertheless be used for authenticating the object. Since the black bars of the code region in FIG. 2(*c*) absorb most of the incident electromagnetic radiation, the scattering signal is very low in this region. Thus the signal obtained from the code region can still be identified in the filtered signal (3-2) in FIG. 3. The fact that most of the light is absorbed in the region of the dark components of an optical code and these components therefore make only a low or no contribution to the scattering signal, means that the informational content for authentication is lower. A low informational content basically means that fewer objects can be unmistakably distinguished by means of the scattering signal. To increase reliability it can therefore be useful and/or necessary for the scattering region and the code region to overlap each other either not at all or only to a small extent.

Preferably the scattering region and the code region are arranged in such a manner in relation to each other that the signal from the code region can be used for positioning and/or determining the position of the identifier in relation to the scanning unit. Due to the coarse structures of the code region, which are visible to the human eye, the manual positioning of the identifier in relation to the scanning unit can be carried out easily using the structures of the code region. Due to the finer structures used for authentication, higher positioning accuracy of the identifier in relation to the scanning unit is required.

According to the invention, this problem is solved by the fact that the code region is used for manually and/or automatically positioning and/or determining the position of the identifier.

This can be carried out in two steps. First of all the identifier and the scanning unit are positioned manually in relation to each other, the optical code on the code region of the identifier or part of the optical code being aligned with a mark on the scanning unit or superimposed on a mark on the scanning unit. If necessary, automatic accurate positioning is carried out in a second step in such a manner that the code region or part of the code region is irradiated and the signal reflected by the code region or part of the code region is analyzed. The interpreted signal is used for triggering an actuator which positions the identifier and the scanning unit sufficiently accurately in relation to each other.

This positioning accuracy plays an important role in the two interconnected processes of initial scanning and authentication.

For the initial scanning process it is important for the identifier and the scanning unit to be positioned in such a manner in relation to each other that an optimum signal-to-noise ratio is transmitted to the detector, since the signal received by the detector is used for determining a signature which is used as a reference signature for all future authentication processes. The higher the signal-to-noise ratio of the initial scanning, the greater the reliability with which the object can be reidentified or distinguished from other objects or other objects distinguished from it at a later point in time. The optimum position is crucially dependent on the concrete design of the scanning unit, the object and the identifier. Reference should be made to the descriptions of WO 2005088533(A1) and WO 2006016114(A1) with regard to optimizing the position of the initial scanning. Preferably the identifier is flat. The electromagnetic radiation for scanning the identifier should preferably impinge vertically onto the plane of the identifier. During the relative movement between the identifier and the scanning unit, during which various regions of the identifier are scanned, the incidence should remain vertical. The degree of tilting of the identifier plane in relation to the impinging radiation should be less than 10°. Preferably the radiation reflected by the identifier should be scanned at an angle within a range of from ±1° to ±60° to either side of the incident radiation. The distance between the identifier and the scanning unit along the vertical z axis of the incident radiation should preferably be between 0.5 mm and 30 cm. The scanning preferably takes place along one of the straight lines of the identifier plane. The length of these straight lines corresponds to the length of the scanned region in the x direction and is preferably between 1 mm and 30 cm. The y axis, which is vertical to the x axis and also lies in the identifier plane, indicates the second dimension of the scanned region. The size of the scanned region along the y axis depends on the spot size of the laser and on whether the object is scanned in only one direction (x) or also in a second direction (y).

During the (subsequent) authentication of the object, the position of the identifier and the scanning unit in relation to each other should as far as possible be the same as during the initial scanning. Slight deviations may always occur, since the object can undergo changes over time and scanning units never have precisely the same design but display fabricational differences. The greater the identity of the position, the greater the certainty of being able to determine whether or not the scanned object is identical to an object previously scanned. If possible, the position of the identifier when authenticating the object (x, y and z coordinates) should only differ from that of the identifier during the initial scanning to a degree of less than 1 cm, preferably less than 5 mm, and particularly preferably less than 1 mm. The identifier should be tilted (about the x or y axis) by less than 10°, and rotated (about the z axis) by less than 10°, compared with the position of the initial scanning.

Depending on the task for which the process according to the invention is used, various procedures are employed:

1 Identification:

The process according to the invention can be fundamentally used purely for the identification of objects:

- a. Manual and/or optionally automatic positioning of the identifier and the scanning unit in relation to each other, the optical code or part of the optical code of the code region and/or a mark on the scanning unit preferably being used as an aligning means,
- b. irradiating the code region with electromagnetic radiation,
- c. scanning the electromagnetic radiation reflected by the code region by means of at least one detector and converting the electromagnetic signal into an electronic signal,
- d. optionally digitalizing the electronic signal and decoding the digitalized signal for determining an identification code,
- e. optionally comparing the identification code with identification codes stored in a database,
- f. optionally emitting the identification code,
- g. optionally emitting a different item of information related to the identification code (e.g. the price of a product).

2. Authentication:

The process according to the invention can fundamentally be used purely for authenticating objects:

a. Manual and/or automatic positioning of the identifier and the scanning unit in relation to each other, the optical code or part of the optical code of the code region and/or a mark on the scanning unit preferably being used as an aligning means,
b. if necessary, automatically accurately positioning the identifier and the scanning unit in relation to each other, the code region or part of the code region being irradiated with electromagnetic radiation, the light reflected by the code region or part of the code region being scanned and analyzed by at least one detector, and an actuator being triggered by the analyzed signal which accurately positions the identifier and the scanning unit in relation to each other,
c. irradiating the scattering region with coherent electromagnetic radiation,
d. scanning the electromagnetic radiation reflected by the scattering region by means of at least one detector and converting the electromagnetic signal into an electronic signal,
e. optionally filtering the signal, particularly if the code region and the scattering region partially or completely overlap each other in order to free the scattering signal as completely as possible from the code signal,
f. optionally digitalizing and decoding the scattering signal in order to determine a signature,
g. optionally comparing the signature with signatures of objects scanned at an earlier point in time,
h. optionally emitting information revealing the extent to which the signature of the object corresponds to one of the signatures of objects already scanned at an earlier point in time.

3. Combined identification and authentication

The combined identification and authentication of an object are carried out by performing the identification and the authentication in succession. Preferably identification is carried out in a first step and authentication in a second step:

a. Manual and/or automatic positioning of the identifier and the scanning unit in relation to each other, the optical code or part of the optical code of the code region and/or a mark on the scanning unit preferably being used as an aligning means,
b. irradiating the code region with electromagnetic radiation,
c. if necessary, automatically accurately positioning the identifier and the scanning unit in relation to each other, the light reflected by the code region or part of the code region being scanned and analyzed by at least one detector and an actuator being triggered by the analyzed signal which accurately positions the identifier and the scanning unit in relation to each other,
d. scanning the electromagnetic radiation reflected by the code region with at least one detector and converting the electromagnetic signal into an electronic signal, optionally digitalizing the electronic signal, optionally decoding the digitalized signal in order to determine an identification code, optionally comparing the identification code with identification codes stored in a database, optionally emitting the identification code and optionally emitting another item of information related to the identification code (e.g. the price of a product),
e. irradiating the scattering region with coherent electromagnetic radiation,
f. scanning the electromagnetic radiation reflected by the scattering region with at least one detector and converting the electromagnetic signal into an electronic signal, optionally filtering the signal if the code region and the scattering region partially or completely overlap each other in order to free the scattering signal as completely as possible from the code signal, optionally digitalizing and decoding the scattering signal in order to determine a signature, optionally comparing the signature with signatures of objects which were scanned at an earlier point in time and optionally emitting information revealing the extent to which the signature of the object corresponds to one of the signatures of objects scanned at an earlier point in time.

4. Simultaneous identification and authentication

The simultaneous identification and authentication of an object are carried out by identifying and authenticating the object at the same time:

a. Manual and/or automatic positioning of the identifier and the scanning unit in relation to each other, the optical code or part of the optical code of the code region and/or a mark on the scanning unit preferably being used as an aligning means,
b. irradiating the code region and the scattering region with coherent electromagnetic radiation,
c. if necessary, automatically accurately positioning the identifier and the scanning unit in relation to each other, the light reflected by the code region or part of the code region being scanned and analyzed by at least one detector and an actuator being triggered by the analyzed signal which accurately positions the identifier and the scanning unit in relation to each other,
d. scanning the electromagnetic radiation reflected by the code region and the scattering region with at least one detector and converting the electromagnetic signal into an electronic signal, optionally digitalizing the electronic signal, optionally filtering the signal to determine separate identification and authentication signals, optionally digitalizing the signals, optionally decoding the identification signal in order to determine the identification code, optionally decoding the authentication signal in order to determine the signature, optionally emitting the identification code, optionally emitting another item of information related to the identification code (e.g. the price of a product), optionally comparing the signature with signatures of objects scanned at an earlier point in time and optionally emitting information revealing the extent to which the signature of the object corresponds to one of the signatures of objects scanned at an earlier point in time.

It may be mentioned that the steps of the abovementioned procedures do not necessarily have to be carried out in the abovementioned order. In particular, signal filtering can be carried out before or after the digitalization of the electronic signal. Preferably, signal filtering is carried out using electronic circuits. For example high pass filters and/or band pass filters are used. The actual design of the signal filter depends on the actual variant of the invention. In this regard reference should be made to manuals on signal processing [e.g. Martin Meyer, "Signalverarbeitung, Analoge and digital Signale" (Signal processing, analog and digital signals), 4th Edition, Publ: Vieweg-Verlag, 2006].

In one preferred variant of the process according to the invention, the information from the identification process is used in the authentication process. The optical code is decoded. The decoded information provides information about the identity of the object. For the verification of the identity it is therefore not necessary to compare the newly scanned signature with all signatures already scanned at an earlier point in time. The information from the optical code allows the reduction of the number of signatures for comparison to a few (less than 1000) signatures, ideally to only a single signature.

The process according to the invention unites the advantages of identifying objects by scanning optical codes and authenticating objects by scanning their scattering pattern. In addition, the process according to the invention produces synergistic effects. First of all, the existence of the code region allows the effective and efficient positioning of the identifier and the scanning unit in relation to each other. By means of the code region it is always possible to find the region used for authentication each time scanning is repeated. In addition, the process according to the invention allows the use of an IT system already existing for identification solutions using optical codes. In particular, the process according to the invention allows the slow migration from a pure identification solution to a combined identification/authentication solution, since the identifier according to the invention can also be used purely for identification, it also being possible to use already existing scanning systems for optical codes. Thus the user of the process according to the invention can gradually replace existing scanning systems for identification by means of optical codes by the scanning systems according to the invention and expand the database for identification solutions by the possibility of storing and comparing authentication/reference data sets (this representing only a low market entry barrier).

Finally, the process according to the invention allows the use of a single scanning unit for identifying and authenticating an object, and possibly even for simultaneously identifying and authenticating an object. The scanning unit is described in more detail in the following.

The present invention also relates to a scanning unit for the parallel identification and authentication of objects.

The scanning unit according to the invention comprises at least one source of coherent electromagnetic radiation, preferably having a wavelength between 300 nm and 1900 nm, particularly preferably in the range between 400 nm and 1000 nm, and very particularly preferably in the range between 500 nm and 800 nm. The coherent radiation source is used for illuminating the identifier or part of the identifier.

The geometry of the laser spot on the surface of the identifier is preferably linear or elliptic, the longer axis of the ellipse or the line preferably being vertical to the relative direction of movement between the scanning unit and the identifier. The lengths of the axes are preferably between 1 μm and 10 mm.

The scanning unit according to the invention also comprises at least one detector unit for receiving the electromagnetic radiation reflected by the identifier or part of the identifier. The at least one detector unit converts electromagnetic radiation into electronic signals. Suitable detector units are for example photodiodes or cameras (CCD, CMOS).

The scanning unit according to the invention preferably comprises at least one analog to digital converter (A/D converter) which converts analog electronic signals into digital electronic signals.

The scanning unit according to the invention preferably comprises at least one decoder unit which converts the electronic signals into digital information. The decoder unit is usually a microprocessor.

In the following, the scanning unit according to the invention is illustrated by some variants without, however, limiting the invention to these variants.

Figure 4:
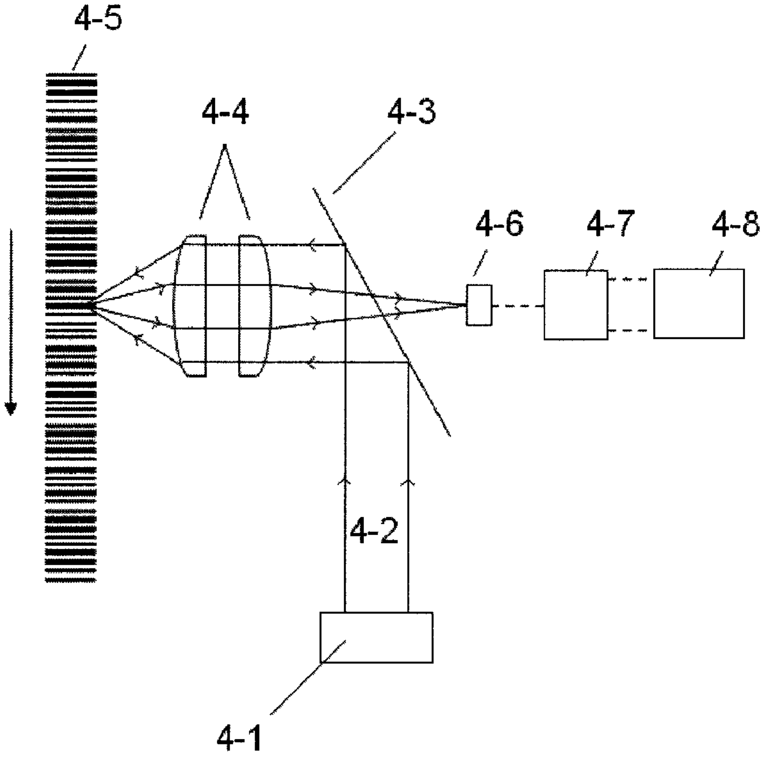
FIG. 4 depicts an embodiment of a scanning unit.

FIG. 4 depicts a scanning unit consisting of a source (4-1) which produces coherent electromagnetic radiation (4-2), a semi-transparent mirror (4-3), lenses (4-4) for focussing the electromagnetic radiation onto an identifier (4-5), a detector (4-6), a signal filter (4-7) and a decoding unit (4-8).

One particular variant of the device according to the invention is depicted in FIG. 4. A laser (4-1) is used as the source of coherent electromagnetic radiation. The coherent radiation (4-2) emitted by the laser is focussed on the surface of an identifier (4-5) by means of a mirror (4-3) and suitable lenses (4-4). The mirror (4-3) is semi-transparent. The identifier and the scanning unit are moved towards each other (indicated by the arrow next to the identifier). The radiation reflected by the identifier is guided onto a detector (4-6) in which conversion into an electronic signal takes place. The electronic signal is processed by a signal filter in such a manner that two signals result, one signal predominantly containing information on the optical code and being used for identifying the object and the other signal predominantly containing information on the scattering pattern and being used for authentication. The signals are decoded in the decoding unit (4-8). The decoding unit is connected to an external peripheral system (not illustrated in the figure), in which the decoded signals are processed further.

The movement of the identifier and the scanning unit in relation to each other is brought about by means of an actuator (not illustrated in the figure). The movement takes place while retaining a constant distance between the identifier and the scanning unit. Suitable actuators are electric motors such as servomotors, stepper motors or other motors. In addition, other actuators which allow the relative movement of the identifier and the scanning unit in relation to each other, such as for example piezoactors, are also basically suitable.

This movement can be such that the identifier is stationary and the scanning unit is moved; this movement can, however, also be such that the scanning unit is stationary and the identifier is moved.

Figure 5:
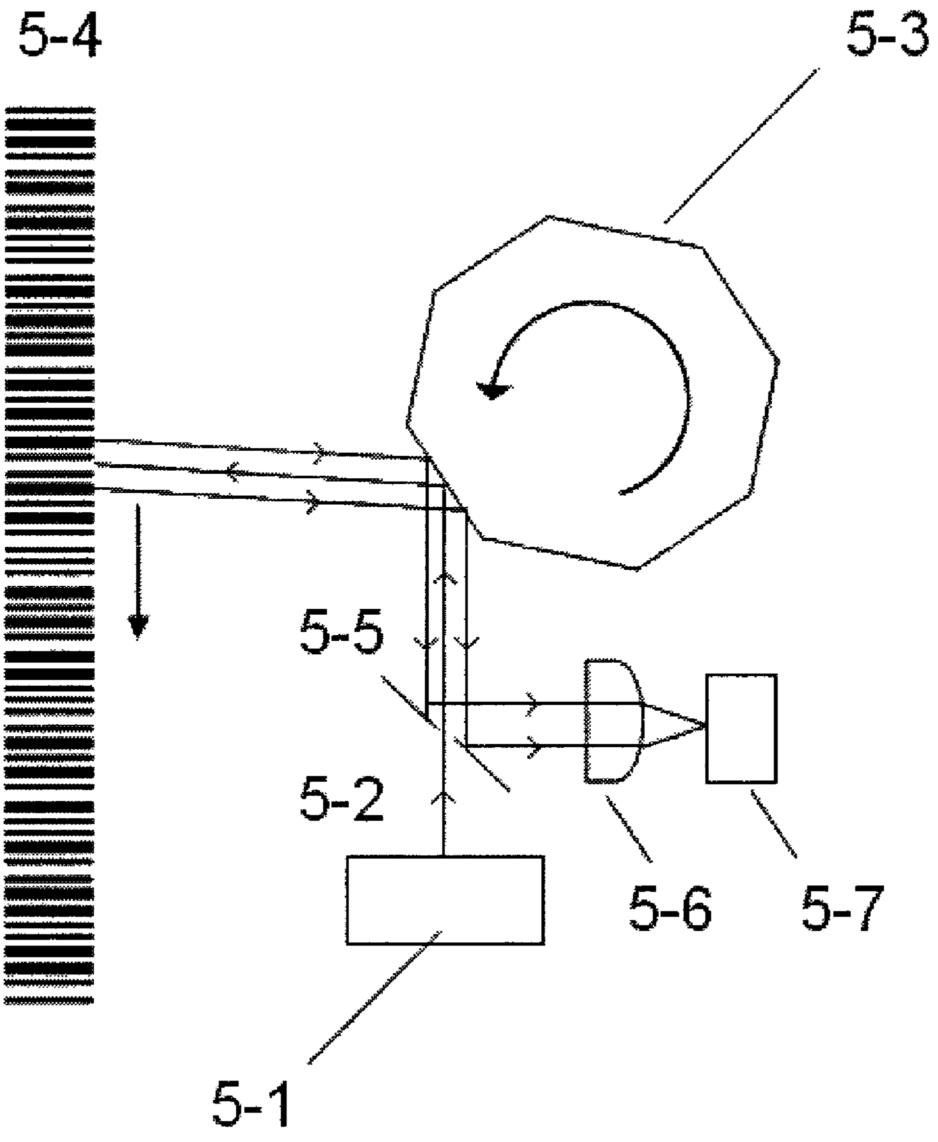
FIG. 5 depicts another embodiment of a scanning unit.

FIG. 5 depicts a scanning unit consisting of a source (5-1) which produces coherent electromagnetic radiation (5-2), a mirror with a hole (5-5), focusing lenses (5-6), a detector (5-7) and a mirror wheel (5-3) which sweeps the electromagnetic radiation over the identifier (5-4).

It is also possible not to move the scanning unit and the identifier and to guide the electromagnetic beam over the identifier by means of a mirror device. One example of such a mirror device is shown in FIG. 5, in which a mirror wheel is used: A laser (5-1) emits coherent electromagnetic radiation (5-2) which is passed through a mirror with a hole (5-5) onto a mirror wheel (5-3). The rotation of the mirror wheel causes the electromagnetic radiation to sweep over the identifier (5-4) in the longitudinal direction. The radiation reflected by the identifier is directed onto a detector (5-7) by means of suitable lenses (5-6). Alternatively to the mirror wheel, an oscillating or tilting mirror can be used. It is also possible to combine two oscillating or tilting mirrors, in order to scan the identifier not only one-dimensionally but also in two dimensions. It is also conceivable to combine an oscillating or tilting mirror with a mirror wheel, in order to obtain the same effect of full-area scanning of the identifier. It is of course also possible to use other optical elements which are capable of deflecting electromagnetic radiation in a suitable fashion for this purpose.

Figure 6:
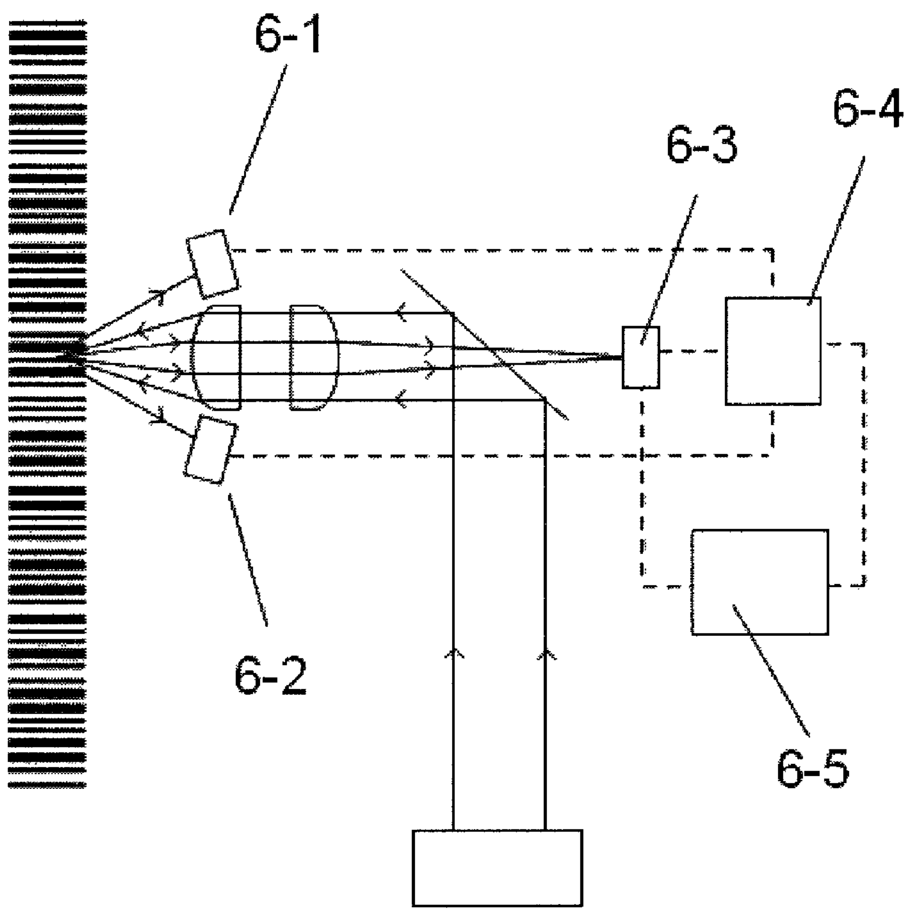
FIG. 6 depicts yet another embodiment of a scanning unit.

FIG. 6 depicts a scanning unit with similar components to those of the example in FIG. 4, as well as an additional two detectors (6-1, 6-2) which are arranged to the side of the beam impinging on the identifier. The detectors (6-1, 6-2) are used for receiving the scattering signal, whereas detector (6-3) is used for receiving the identification signal. Once again a signal filter (6-4) and a decoding unit (6-5) are included for processing the signals.

FIG. 6 shows an additional variant of the scanning unit according to the invention. The above variants (in FIG. 4 and FIG. 5) function using a single detector. It can, however, be advantageous and useful to equip the scanning unit according to the invention with several detectors. As already mentioned above and identifiable from FIG. 2, the variance of the scattering signal is smaller than the variance of the signal which is obtained by scanning the optical code. Additional detectors can be used for increasing the signal-to-noise ratio. Additional detectors also allow signals measured by various detectors to be cross-correlated. This cross-correlation can be used for processing signals and determining the signature, as described e.g. in WO 2005088533(A1).

In addition to the elements already known from FIG. 4, the variant of FIG. 6 has additional detectors (6-1 and 6-2) which are arranged at an angle to either side of the radiation impinging on the identifier. These detectors are used for receiving the scattering signal used for authentification. An additional detector (6-3) is used for receiving the identification signal. Optionally, the scanning unit has a signal filter (6-4) which frees the scattering signal as completely as possible from low frequencies emanating from the optical code. In a decoder unit (6-5) the signals are decoded. The detector (6-3) can optionally also be used for determining the scattering signal.

In addition to the laterally arranged detectors (6-1 and 6-2), additional detectors can be arranged around the incident beam, which are preferably arranged along the same plane as the incident beam. The detectors are preferably arranged at an angle in the range from 1° to 60° to the side of the impinging beam.

Figure 7:
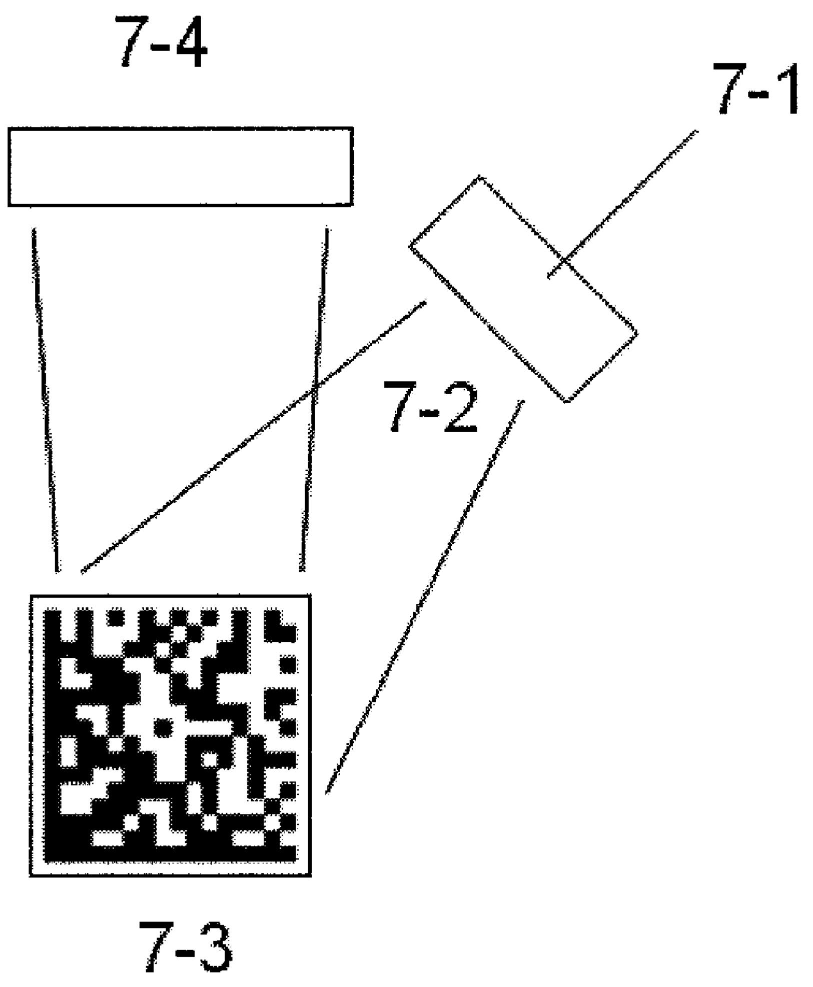
FIG. 7 depicts another scanning unit.

FIG. 7 depicts a scanning unit consisting of a source (7-1) for coherent electromagnetic radiation (7-2) which illuminates the identifier over its entire area (7-3). A full-area detector (7-4) is used for receiving the radiation reflected by the identifier, an image of the identifier being formed on the full-area detector.

FIG. 7 shows an additional special variant of the scanning unit according to the invention. The identifier is illuminated over its entire surface by means of a widening laser beam (7-2). The radiation reflected by the identifier is guided onto a full-area sensor (7-4). Suitable full-area sensors are for example camera systems (CCD, CMOS), although a two-dimensional array of photodiodes is also conceivable. The detector system scans the entire measurement area of the identifier at once. The signal is analyzed analogously to the example in FIGS. 2 and 3.

With the aid of a full-area sensor, the positioning of the identifier in relation to the scanning unit can also be carried out electronically and/or with the aid of software. For this purpose, the camera-detected area, i.e. the region scanned by the full-area sensor is larger than the actual region of the identifier and an image of the optical code plus its surroundings is therefore formed on the full-area sensor. The differences in brightness are converted into electronic signals by the full-area sensor.

Since the individual elements of the full-area sensor (referred to as pixels) can be addressed and selected individually it is possible to select in which region of the camera-detected area the image of the optical code is formed. Since the geometry of the identifier and the arrangement of the scattering region and the code region on the identifier are known, it is possible to calculate which pixels of the full-area sensor have to be selected in order to determine the signal from the scattering region.

In particular, authentication can be carried out and the scattering pattern determined by selecting/using only those pixels which have a minimum brightness. It is possible, not to use those pixels of the dark regions of the optical code for determining the scattering pattern, in order to circumvent the problem of signal filtering.

It may be mentioned that the scanning unit according to the invention can also be obtained by combining elements from the variants of FIGS. 4, 5, 6 and 7. Thus, it is for example possible to combine a full-area detector, for example, with a photodiode in a scanning unit according to the invention. The full-area detector is used for the rapid identification and positioning of the identifier and the scanning unit in relation to each other, since the full-area detector reads the identifier as a whole and therefore no movement of the identifier and the scanning unit towards to each other need take place. In a second step the scattering region of the identifier is scanned by a laser and the scattering pattern is read. For the identification process it is also not absolutely necessary to use a laser, so that the scanning unit according to the invention is for example equipped with LEDs (light emitting diodes) which illuminate the identifier over its entire area in order to scan the optical code and/or position the identifier, and in particular the scattering region in relation to the scanning unit, whereas a laser is only used for authentication.

Preferably, the scanning unit according to the invention has a housing for protecting the components against soiling. Preferably at least one window is inserted in the housing, through which the electromagnetic scanning beam can issue and impinge on the identifier. In addition, the radiation reflected by the identifier can preferably enter the housing through the same window and impinge on the detector.

Preferably, the identifier is positioned manually in relation to the window for identifying/authenticating the object. For this purpose marks on or connected to the housing or on or in the window can be used. Preferably the identifier is not moved in relation to the window and the housing, whereas the scanning unit and/or the electromagnetic radiation is moved inside the housing. When using only a full-area sensor as the detector unit no movement at all is of course necessary.

It is conceivable to introduce several scanning units next to each other into the housing in order to increase the signal-to-noise ratio or to be able to carry out the identification and/or authentication more quickly.

The scanning unit according to the invention is preferably connected to a peripheral system in which the decoded signals are processed further. The connection between the scanning unit and the peripheral system can be electronic via cables, via radio, optical, acoustic or via other signal transmission channels. The peripheral system preferably comprises a database with stored signatures and/or identification codes. It also preferably comprises technical components (microprocessors) for comparing signatures already scanned an earlier point in time with newly scanned signatures. It also preferably comprises other data which can be correlated with the identification codes. Preferably the peripheral system includes the possibility of transmitting information to a user with the aid of optical and/or acoustic and/or other signals perceived by the human senses.

It is conceivable to insert parts of the peripheral system into the housing together with one or more scanning units.

The process according to the invention and the scanning unit according to the invention are suitable for identifying and/or authenticating persons, animals and all other conceivable items such as packaging, letters, parcels, documents, money, identity cards, jewellery, medicaments, electronic and mechanical components, intermediates, end products and other valuable objects, etc.

The invention is distinguished by a high degree of robustness, can be used both in a stationary and a mobile form, is intuitively applicable, inexpensive to produce and use and can be combined with already existing identification processes using optical codes.

The invention claimed is:

1. A process for identifying and/or authenticating an object comprising the steps of providing an identifier with the object, having a code region containing at least one optical code and a scattering region containing a plurality of scattering centers, positioning the object and the scanning unit manually in relation to each other, irradiating at least part of the identifier with coherent electromagnetic radiation, capturing the reflected radiation by at least one detector, converting into an electronic signal from which an identifiable signature is determined, and filtering the signal for producing two signals, one of which predominantly contains information on the optical code and the other of which predominantly contains information on the scattering pattern of the scattering surface of the object, the first signal being used for identifying the object and the second signal being used for authenticating the object.

2. The process according to claim 1, wherein at least part of the electromagnetic radiation is coherent.

3. The process according to claim 1, wherein part of the scattering region overlaps part of the code region.

4. The process according claim 1, wherein the code region is located inside the scattering region or the scattering region is located inside the code region.

5. The process according to claim 1, wherein at least part of the identifier is dot scanned or line scanned by a source of electromagnetic radiation.

6. The process according to claim 1, wherein at least part of the identifier is illuminated over its entire surface by a source of electromagnetic radiation.

7. The process according to claim 1, further comprising the step of positing manually the object and the scanning unit in relation to each other, irradiating the at least one optical code or part of the at least one optical code with electromagnetic radiation and capturing the radiation reflected by the optical code or part of the optical code by at least one detector and converted into an electronic signal, utilizing the electronic signal for triggering an actuator which accurately repositions the object and the scanning unit in relation to each other, irradiating with coherent electromagnetic radiation one region of the object which scatters electromagnetic radiation and whose position is clearly predetermined in relation to the position of the optical code, capturing the radiation reflected by the scattering region by at least one detector and converting the radiation captured into an electronic signal from which an identifiable signature is determined.

8. The process according to claim 1, further comprising the step of utilizing a full-area detector as the at least one detector on which an image of the optical code is formed and utilizing only bright pixels of the optical code on the full-area detector for determining a signature.

9. The process according to claim 1, further comprising the step of utilizing the information obtained from the optical code to select one or several signatures in order to compare them with a current signature.

10. A device for identifying and/or authenticating an object, comprising at least one coherent source for emitting electromagnetic radiation onto the object, at least one detector for capturing the electromagnetic radiation reflected by the object and for converting the radiation into an electronic signal and a signal filter for filtering the electronic signal such that two signals result, one is used for identifying the object and the other of which is used for authenticating the object.

11. A device according to claim 10, wherein the signal which is used for identifying the object is employed for triggering an actuator which positions the object and at least one source of electromagnetic radiation in relation to each other.

* * * * *